(12) United States Patent
Helfenstein

(10) Patent No.: US 10,961,058 B2
(45) Date of Patent: Mar. 30, 2021

(54) VIBRATORY CONVEYOR

(71) Applicant: K-TRON Technologies, Inc., Sewell, NJ (US)

(72) Inventor: Urs Helfenstein, Buchs (CH)

(73) Assignee: K-TRON Technologies, Inc., Sewell, NJ (US)

( * ) Notice: Subject to any disclaimer, the term of this patent is extended or adjusted under 35 U.S.C. 154(b) by 0 days.

(21) Appl. No.: 16/085,682

(22) PCT Filed: Mar. 13, 2017

(86) PCT No.: PCT/IB2017/051451
§ 371 (c)(1),
(2) Date: Sep. 17, 2018

(87) PCT Pub. No.: WO2017/158496
PCT Pub. Date: Sep. 21, 2017

(65) Prior Publication Data
US 2019/0100380 A1    Apr. 4, 2019

(30) Foreign Application Priority Data
Mar. 15, 2016  (CH) ..................... 00353/16

(51) Int. Cl.
*B65G 27/32*   (2006.01)
*B65G 27/08*   (2006.01)
(Continued)

(52) U.S. Cl.
CPC ............ *B65G 27/32* (2013.01); *B65G 27/08* (2013.01); *B65G 27/16* (2013.01); *B65G 27/26* (2013.01);
(Continued)

(58) Field of Classification Search
CPC ........ B65G 27/16; B65G 27/26; B65G 27/20; B65G 27/32; B65G 27/08; B65G 2201/042; B65G 2812/0312; B65G 2814/0335
(Continued)

(56) References Cited

U.S. PATENT DOCUMENTS 2,333,338 A * 11/1943 Rapp ..................... B65B 1/08
                                                        177/DIG. 11
2,797,796 A *  7/1957 Carrier, Jr. ............ B65G 27/26
                                                            198/760
(Continued)

FOREIGN PATENT DOCUMENTS

DE    2905718 A1    8/1980
DE    4326530 A1   10/1994
(Continued)

OTHER PUBLICATIONS

PCT/IB2017/051451 International Preliminary Report on Patentability dated Jun. 2, 2019.
(Continued)

*Primary Examiner* — James R Bidwell
(74) *Attorney, Agent, or Firm* — Wood Herron & Evans LLP

(57) ABSTRACT

The invention relates to a vibratory feeder comprising a support arrangement (8), for carrying out a vibrational movement when in operation, for a feeder element in which material (12) which is to be fed is fed, also comprising a drive arrangement (5) for the support arrangement (8) and a bearing arrangement (3) which initiates vibrational oscillations of the vibratory feeder (1, 30, 40, 60, 90, 100) reducing in the base (2). Means which suppress a movement of the vertical components due to the vibratory movement of the front end (10*a*) of the feeder element from that of the rear end (10*b*) when the vibratory feeder (30, 40, 60, 90, 100) is
(Continued)

Figure 1:
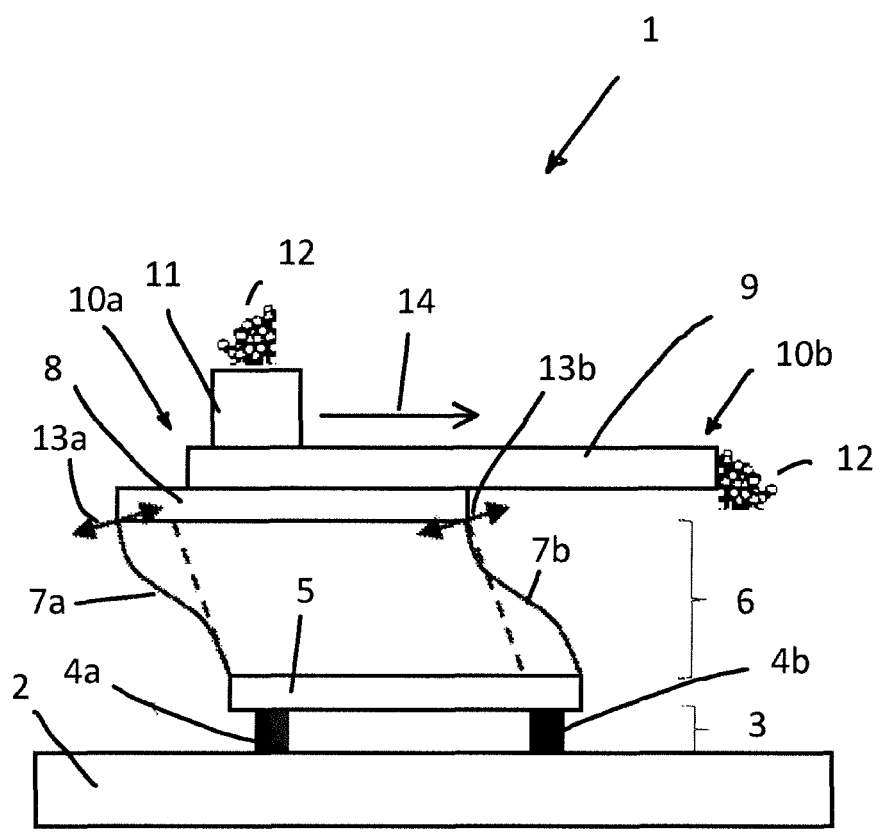

in operation are provided. The mass flow emitted by the vibratory feeder (30, 40, 60, 90, 100) can be easily changed without a time delay which can therefore improve the control of the vibratory feeder.

14 Claims, 11 Drawing Sheets

(51) Int. Cl.
　　*B65G 27/16* (2006.01)
　　*B65G 27/26* (2006.01)
(52) U.S. Cl.
　　CPC ............ *B65G 2201/042* (2013.01); *B65G 2812/0312* (2013.01); *B65G 2814/0335* (2013.01)
(58) Field of Classification Search
　　USPC ................................ 198/758, 759, 760, 767
　　See application file for complete search history.

(56) References Cited

U.S. PATENT DOCUMENTS

| | | | |
|---|---|---|---|
| 2,951,581 A | 9/1960 | Long et al. | |
| 3,165,197 A | 1/1965 | Allen et al. | |
| 3,630,342 A * | 12/1971 | Danyluke | B65G 27/20 198/570 |
| 4,313,535 A | 2/1982 | Carmichael | |
| 4,527,747 A | 7/1985 | Scharmer et al. | |
| 5,056,652 A | 10/1991 | Kraus et al. | |
| 5,094,342 A | 3/1992 | Kraus et al. | |
| 6,047,811 A | 4/2000 | Zittel et al. | |
| 6,868,960 B2 * | 3/2005 | Jones | B65G 27/20 198/762 |
| 7,387,198 B2 * | 6/2008 | Thomson | B65G 27/20 198/760 |
| 8,770,389 B2 * | 7/2014 | Millard | B65G 27/24 198/760 |
| 9,181,037 B1 | 11/2015 | Tomlinson et al. | |

FOREIGN PATENT DOCUMENTS

| | | |
|---|---|---|
| EP | 0453241 A1 | 10/1991 |
| GB | 842560 A | 7/1960 |
| WO | 2009078273 A1 | 6/2009 |

OTHER PUBLICATIONS

WO2017/158496 International Search Report dated May 24, 2019.
PCT/IB2017/051451 European Search Report dated Feb. 6, 2020.

* cited by examiner

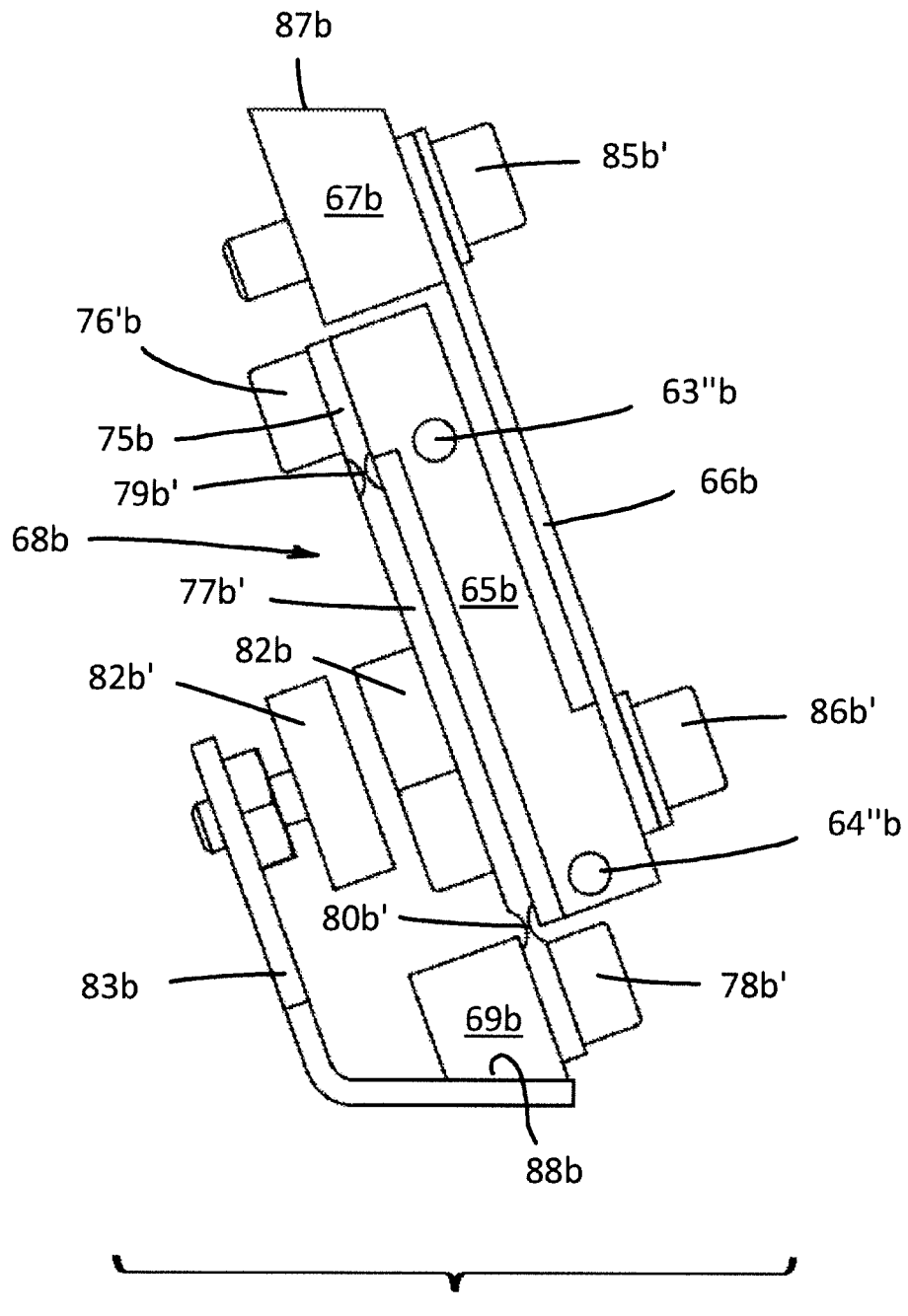
Fbig 5b

VIBRATORY CONVEYOR

The present invention relates to a vibratory feeder according to the preamble of claim 1.

Such vibratory feeders are used in many industry sectors for all kinds of materials, as long as they can be fed by a vibratory feeder at all. In this regard, pourable materials are discharged onto a feeder element, usually a feeder trough, which then carries out a cyclic forward/upward movement with a corresponding return travel, i.e. the vibration, whereby the individual particles of the material are thrown forward at a throwing angle and at the same time slightly upwards. The feeding element performs the return travel before the particles rest on it again, so that the particles can be fed one step further with the next forward/upward movement.

Accordingly, vibratory feeders have a vibrating support arrangement for the exchangeable feeder element which rests thereon and, for example, can be designed depending on to material or other criteria, wherein the support arrangement is set into the desired vibration by a drive arrangement. Due to the vibration movement, the drive arrangement of the vibration feeder oscillates (reaction forces) as well, with the result that the bearing of the vibration feeder must be formed from elastic support members or feet, for example, in order to reduce the vibrations of the drive arrangement introduced into the ground, since otherwise considerable noise can be generated and machines or systems nearby can be disturbed.

Vibratory feeders, especially those with a feeder trough are difficult to design, are largely manufactured according to empirical findings and adapted to the material to be fed in terms of frequency and throwing angle through testing.

Some concepts work as desired, others show a poor feeding quantity without the reasons being clear in specific cases.

A disadvantage of the known vibratory feeders is the time-delayed controllability of the mass flow output at the end of the feeder element or the feeder trough, which drifts more or less constantly without control, either because of the irregular filling of the feeder element or because of other influences, which is particularly problematic with gravimetric dosing (if a vibratory feeder is arranged on a scale), but also creates problems with volumetric dosing.

It is therefore the object of the present invention to create a vibratory feeder with a short control time.

This object is achieved by a vibratory feeder with the characterizing features of claim 1.

Because a deviation of the vertical component of the vibrational movement (at least) of the front end of the feeder element from that of the rear end of the feeder element is suppressed, the material distribution over the length of the feeder element remains substantially the same even if the parameters for the feeding quantity are changed. The output mass flow of the material fed therefore changes without delay.

Features of preferred embodiments are specified in the dependent claims.

Figure 2:
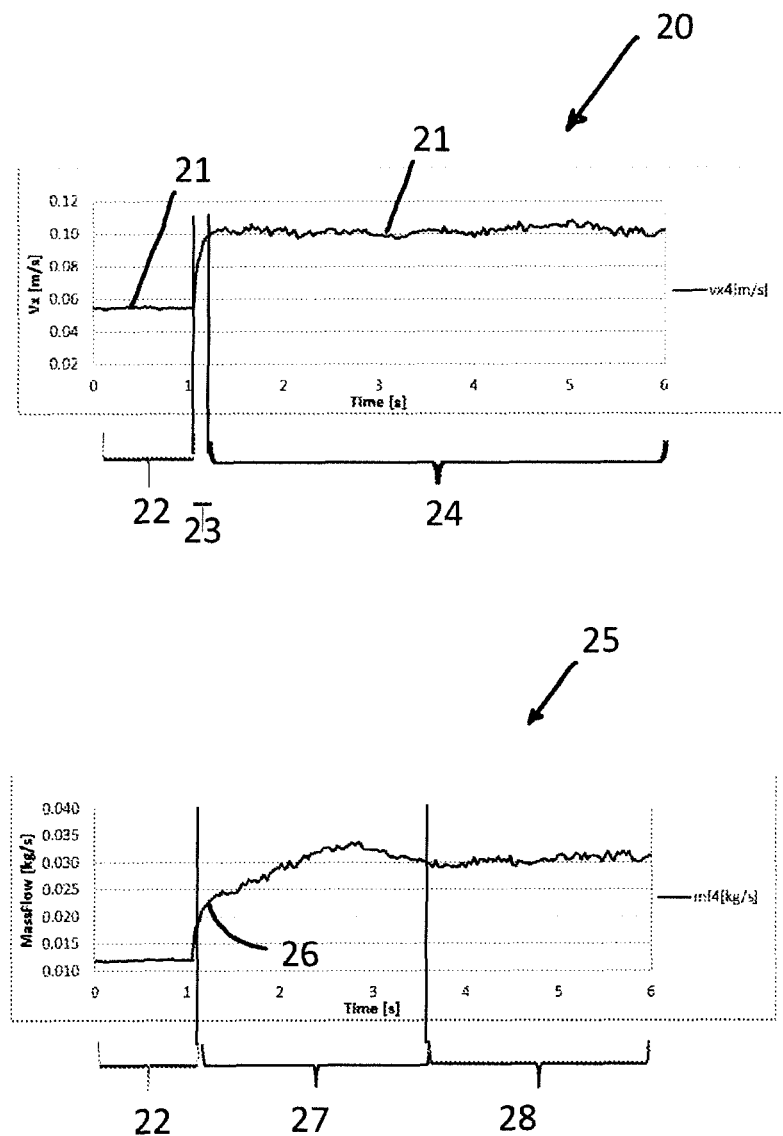
Figure 3A:
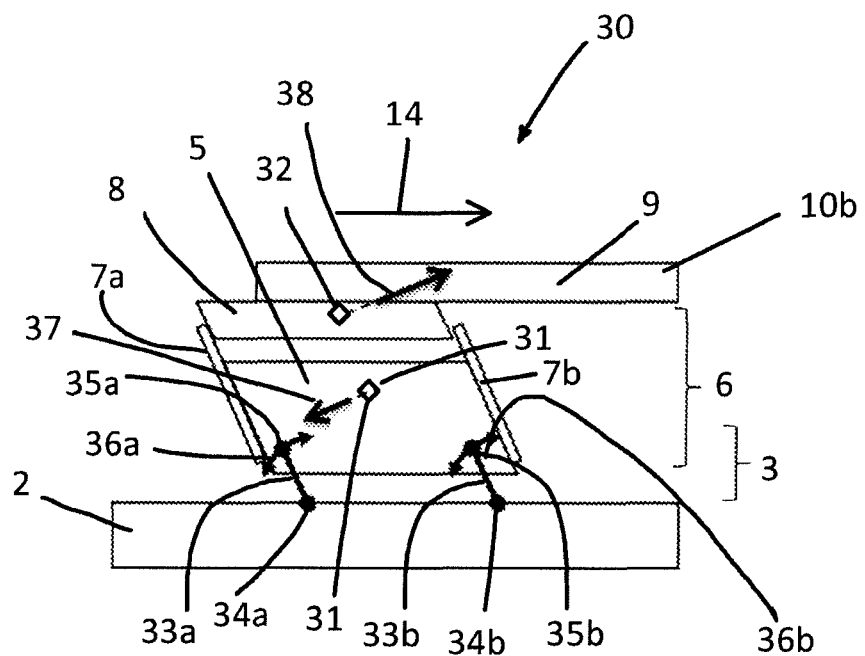
Figure 3B:
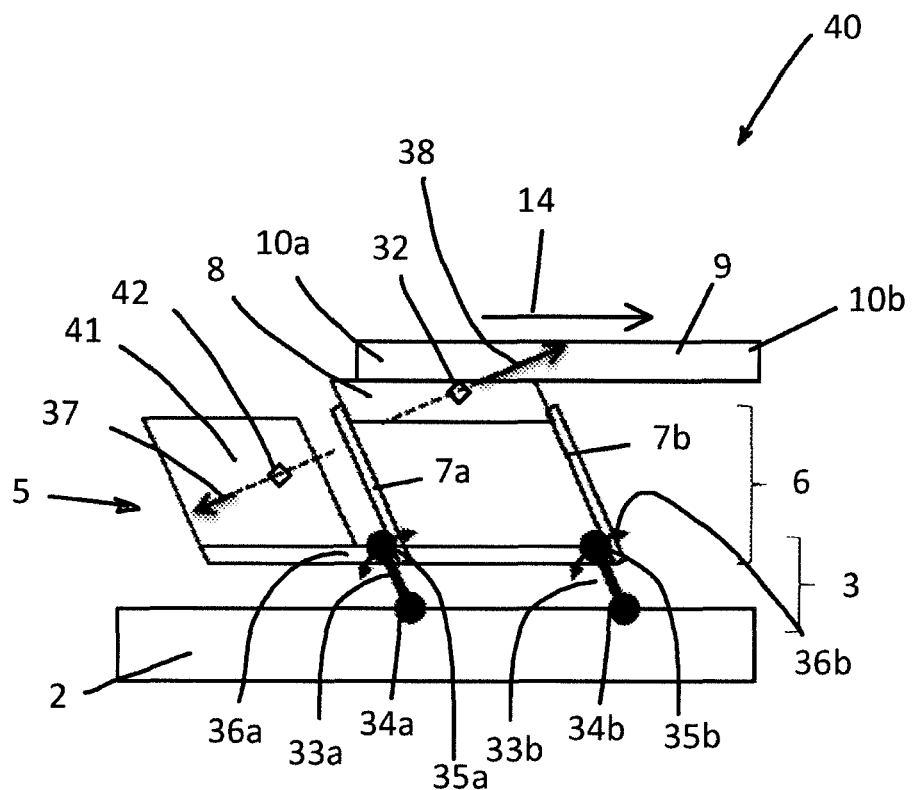
Figure 4A:
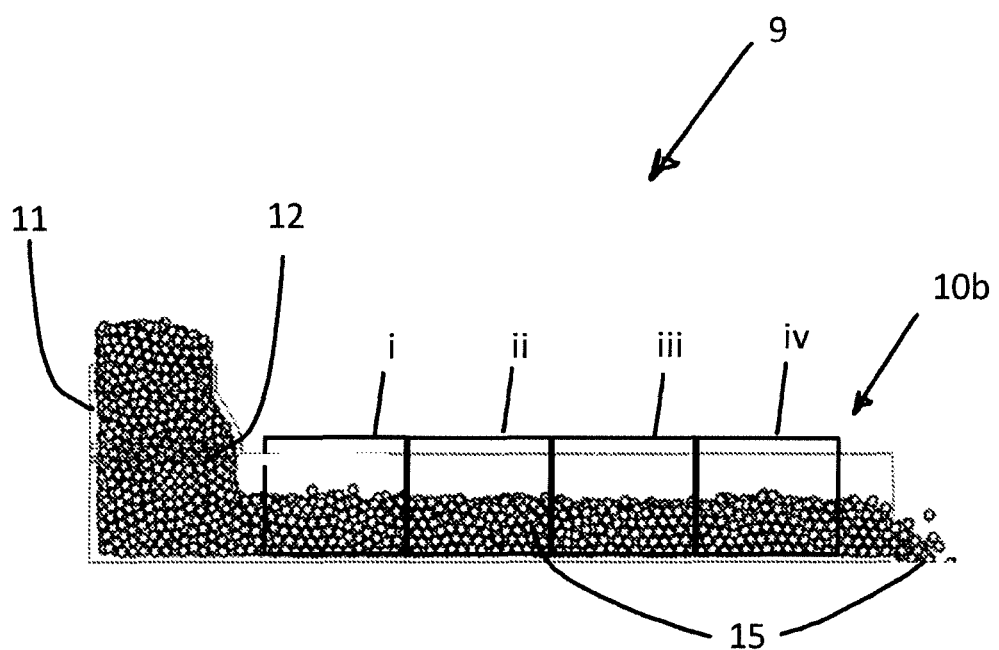
Figure 4B:
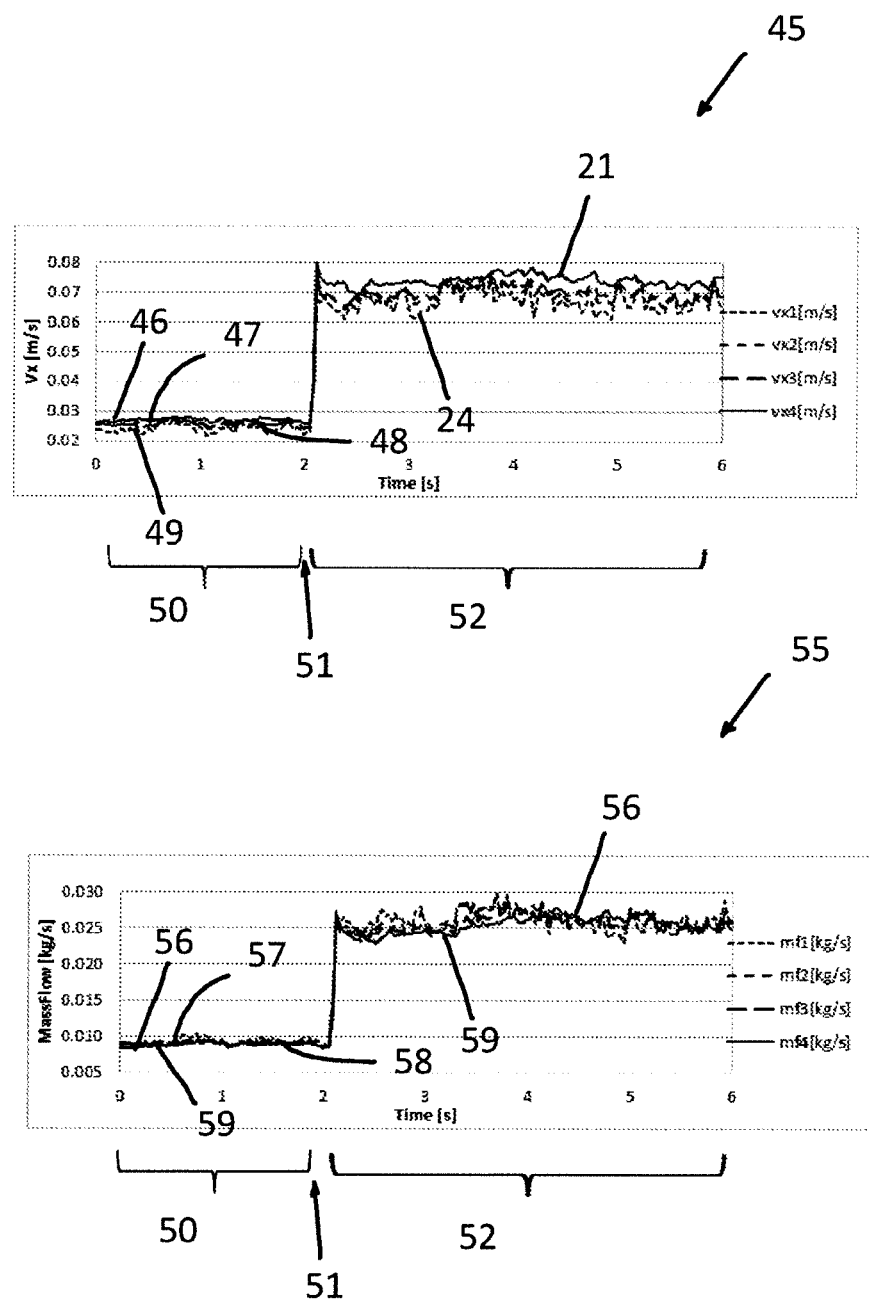
Figure 5A:
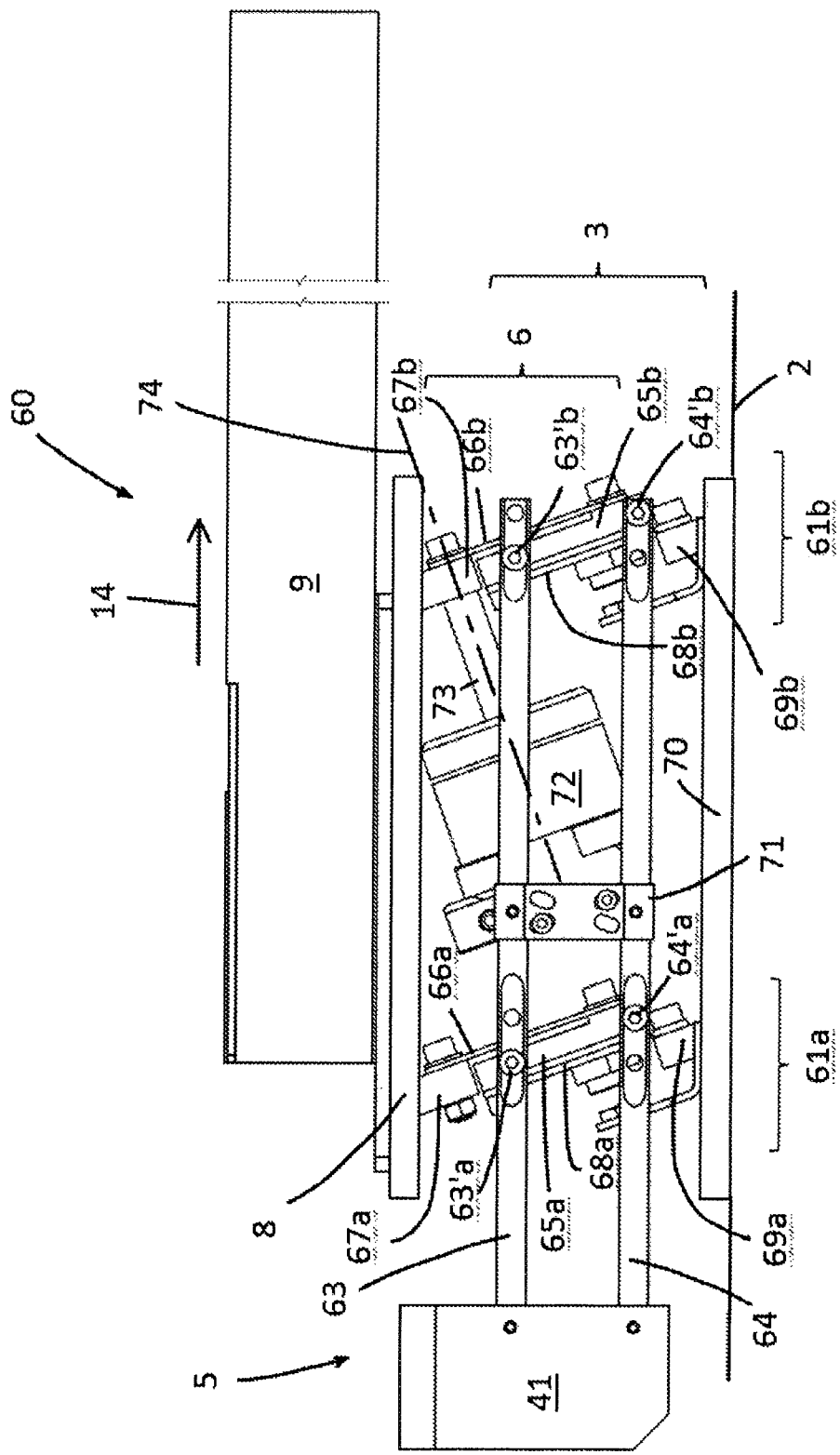
Figure 5C:
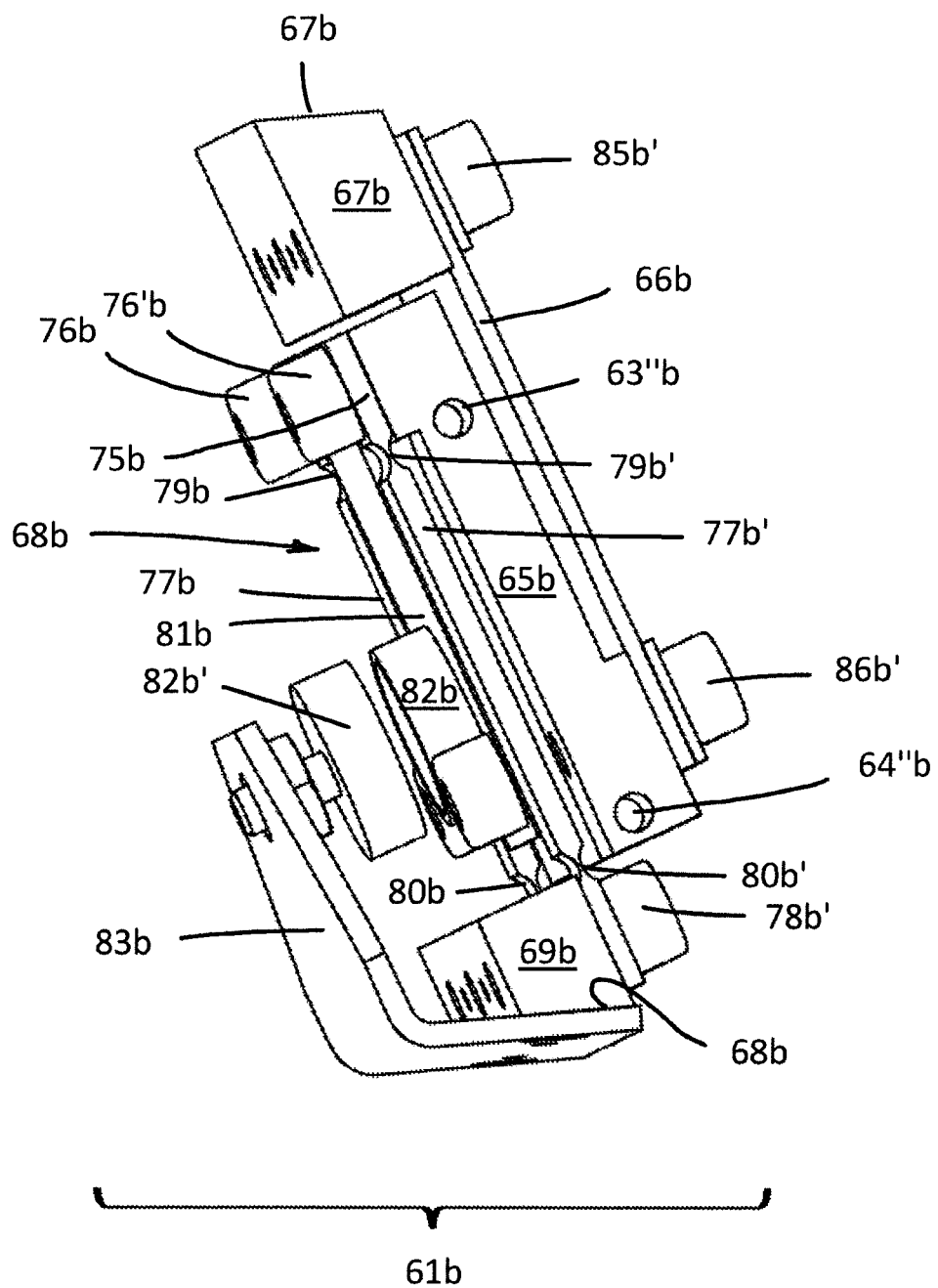
Figure 6:
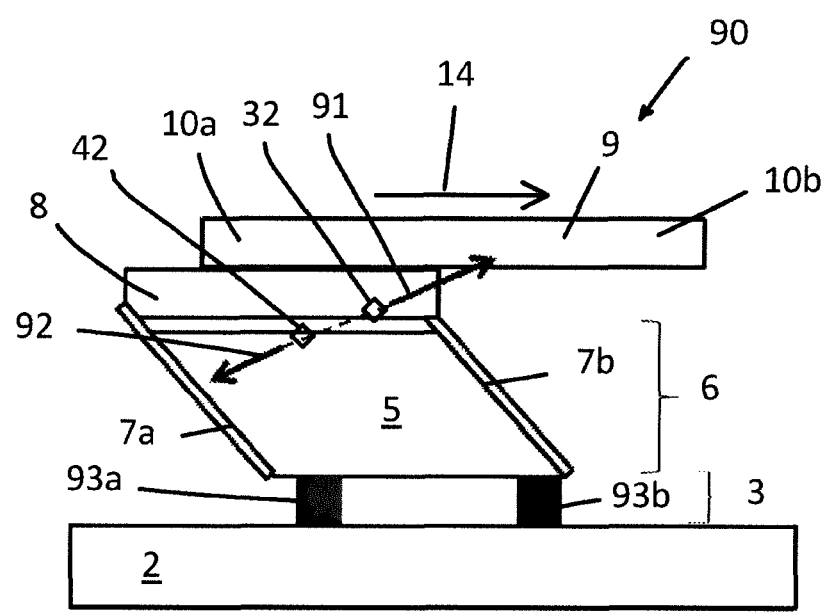
Figure 7A:
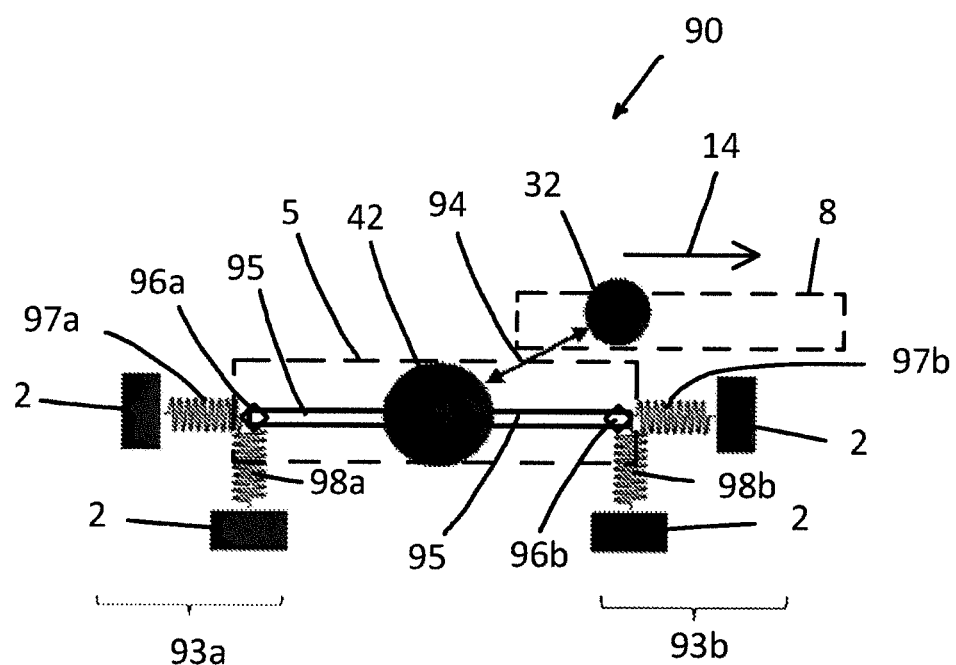
Figure 7B:
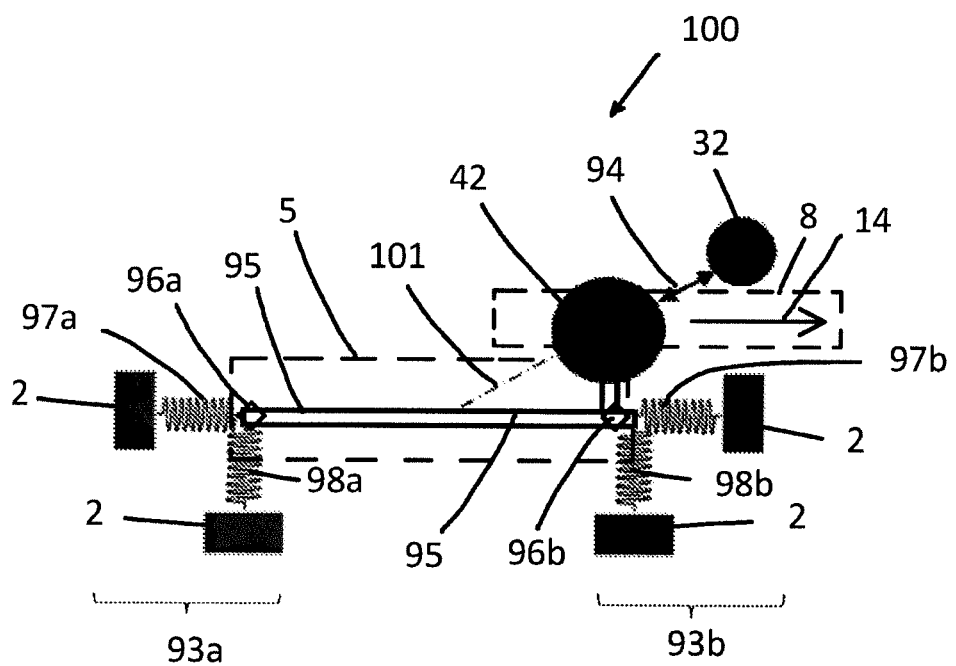
Figure 8A:
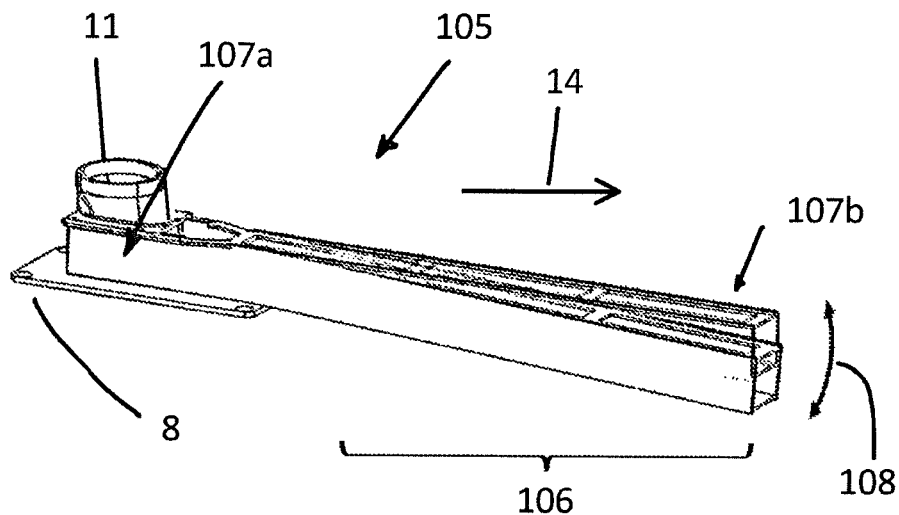
Figure 8B:
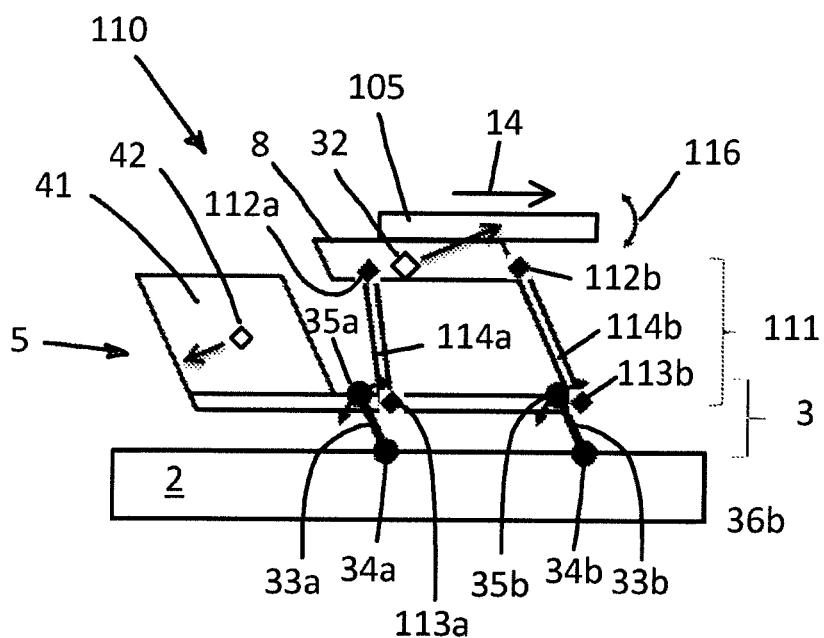

Hereinafter, the invention is explained by means of the figures. Identical objects are denoted in the figures by identical reference signs. In the figures:

FIG. 1 shows a schematic illustration of a vibratory feeder according to the prior art, FIG. 2 shows two diagrams regarding the flow of the bulk material in a vibratory feeder according to FIG. 1, in each case before and after the change in feeding quantity, FIG. 3a schematically shows a first embodiment of the vibratory feeder according to the invention, FIG. 3b schematically shows a preferred modification of the first embodiment according to FIG. 3a, FIG. 4a schematically shows the subdivision of the feeder trough of a vibratory feeder into different sections for a simulation calculation, FIG. 4b shows two diagrams regarding the flow of the bulk material in a vibratory feeder according to the invention, in each case before and after the change in feeding quantity, FIG. 5a shows a view of a vibratory feeder according to the preferred modification of the first embodiment according to FIG. 3b, FIG. 5b shows a detailed side view of a functional unit of the vibratory feeder of FIG. 5a, FIG. 5c shows a view obliquely from below of the functional unit of FIG. 5b, FIG. 6 schematically shows a second embodiment of a vibratory feeder according to the invention, FIG. 7a schematically shows the geometric conditions according to the invention for the second embodiment according to FIG. 6 using a two-mass model, FIG. 7b schematically shows the geometric conditions according to the invention in the second embodiment according to FIG. 6 in a preferred modification using a two-mass model, FIG. 8a shows a view of a feeder trough of a vibratory feeder which is subject to a deformation vibration during operation, and FIG. 8b schematically shows a modification for compensating the deformation vibration of the feeder trough according to FIG. 8a in a vibratory feeder according to the first preferred embodiment of FIG. 3b.

FIG. 1 schematically shows a vibratory feeder 1 according to the prior art, which is mounted on the base 2 via a bearing arrangement 3 with elastic feet or support members 4a, 4b, and which has a drive arrangement 5 which drives, via a translatory vibrational movement arrangement 6, a vibrating support arrangement 8 on which a feeder element formed here as feeder trough 9 with a rear end 10a and a front end 10b is arranged. The vibrational movement arrangement 6 is generally formed as a parallel guide, here with leaf springs 7a and 7b which always deform equally and move synchronously during operation as the link of the parallel guide.

The feeder trough 9 is loaded via a filling channel 11 at the rear end 10a with bulk material 12 (grain, pharmaceutical products, plastic granulates and powders of all kinds or metallic materials of all kinds, etc.), which is discharged at its front end 10b from the vibratory feeder 1.

The drive arrangement 5 produces in a known manner the vibrational movement of the support arrangement 8 which is guided via the leaf springs 7a, 7b, so that the support arrangement 8 performs a translational, cyclical movement (the vibrational movement) with respect to the drive arrangement 5 in the direction of the illustrated arrows 13a, 13b. The leaf springs 7a, 7b are shown in the figure in a deflected position, while the position shown in a dashed line corresponds to their rest position (between the two deflected positions).

As can be seen from the double arrows 13a, b, the vibrational movement is slightly inclined upwards with respect to the feeding direction 14; this inclination corresponds to the throwing angle at which the vibrating feeder trough 9 throws the bulk material to be fed forward.

During operation, the drive arrangement 5 is exposed to the reaction forces of the support arrangement 8, with the result that it is itself exposed to a vibrational movement in the inversed ratio of the masses of the support arrangement 8 and its mass; this vibrational oscillation of the drive arrangement 5 is reduced via the elastic supports 4a, 4b and introduced into the base 2, so that disturbing noise and vibrations disturbing the surrounding equipment occur only in a reduced manner or are no longer disturbing.

The construction described above is generally known to those skilled in the art.

In summary, FIG. 1 shows a vibratory feeder 1 with a support arrangement 8 vibrating during operation for a feeder element or a feeder trough 9 in which material 12 to be fed is fed, with a drive arrangement 5 for the support arrangement 8 and a bearing arrangement 3 which introduces vibrational oscillations of the vibratory feeder 1 in reduced manner into the base.

As mentioned at the beginning, the vibratory feeders of this type have the disadvantage to be poorly controllable, since in the case of a change in the operating parameters, the mass flow of the bulk material 12 changes only slowly and stably reaches the desired new value only after several seconds (see FIG. 2). This is detrimental for the control, not only when a highly constant operation is to be run, as is the case in the pharmaceutical industry, but also when the feeding operation is to be run precisely along a ramp.

FIG. 2 shows two diagrams 20 and 25 regarding the flow of the bulk material in the feeder trough 9 of the vibratory feeder 1 (FIG. 1) according to a simulation of the applicant, wherein the flow of the bulk material 12 is shown at the front end 10b (FIG. 1) of the feeder trough. In particular, the diagrams of FIG. 2 show the conditions in the case of an increase in the feeding quantity with an increase in the mass flow from approx. 0.012 kg/s to 0.031 kg/s. The diagrams are based on a simulation calculation of the applicant, which is confirmed by measurements, and can be used advantageously for the direct comparison with the vibratory feeder according to the invention (see FIG. 4b).

In diagram 20, curve 21 shows the velocity vx in feeding direction 14 (FIG. 1) of bulk material 12 (as mentioned above at the front end 10b of feeder channel 9, see FIG. 1) over time in seconds (s). In time period 22, the vibratory feeder is operated at a lower feeding quantity. At the time t=1 s, an increase in feeding quantity takes place, wherein the bulk material velocity vx increases practically without delay from the previous one (section 22) to the new, stable velocity in time period 24, see the step in time period 23, in which the change in velocity vx to the new value takes place.

Diagram 25 shows the mass flow kg/s in feeding direction 14 (FIG. 1) of bulk material 15 at the front end 10b of the feeder trough 9. Before the increase in feeding quantity (time period 22), the mass flow is practically constant. After increasing the feeding quantity at the time t=1 s, however, the mass flow rises only slowly and stabilizes only gradually, with the result that the time period 27, in which the change in mass flow takes place, lasts approx. 3.5 seconds. In time period 28, the mass flow is stable at the new value.

According to the applicant's findings, the behavior of the mass flow at the end 10b of the feeder trough 9 is the reason for the poor controllability of a vibratory feeder according to FIG. 1.

FIG. 3a schematically shows a first embodiment according to the invention of a vibratory feeder 30 which can be regulated practically without time delay, i.e. the mass flow of which at the front end 10b of the feeder trough 9 reaches the stable value immediately, practically without time delay, after the change in feeding quantity (see the diagrams of FIG. 4b).

Shown here are the drive arrangement 5, the translational vibrational movement arrangement 6 with two leaf springs 7a, b shown here in their rest position, as well as the support arrangement 8 with the feeder element formed here as feeder trough 9. It is also possible, for example, to provide a rigid parallelogram guide having links running parallel to each other instead of the leaf springs 7a, 7b, wherein the drive for the vibrational movement must then be formed accordingly, since the restoring forces of the leaf springs 7a, 7b are missing.

Furthermore, shown are the center of gravity 31 of the drive arrangement and the common center of gravity 32 of the support arrangement 8 and the feeder trough 9 (preferably with the content of material 12 to be fed) as well as the bearing arrangement 3 modified according to the invention, via which the drive arrangement 5 is mounted on the base 2. According to the invention, the bearing arrangement 3 has two rigid links 33a and 33b, which are hinged to the base 2 via hinge points 34a, 34b and on drive arrangement 5 via hinge points 35a, 35b, which are always aligned in parallel during operation and thus form a parallel guide formed here as a parallelogram guide which connects the drive arrangement 5 with the base 2.

The result is that those means are provided which have a parallel guide provided in the bearing arrangement (3), preferably a parallelogram guide with two rigid links (33a, 33b).

Although the links 33a, 33b are formed to be rigid and thus are suitable for transmitting vibrational oscillations into the base 2, the geometry according to the invention of the vibratory feeder 30 results in that the base is practically decoupled from the vibration vibrations:

During operation, the hinge points 35a, 35b run back and forth on an arc 36a, 36b, according to the double arrows shown in the drawing. The geometry of the links 33a, 33b is designed in such a way that in the rest position (shown in the figure) of the leaf springs 7a, 7b, the tangent to the arcs 36a, 36b in the hinge points 35a, 35b substantially have a gradient corresponding to the throwing angle, thus are parallel to the direction of the vibrational movement indicated by the arrows 37, 38. The arrows 37, 38 show not only the direction of the vibrational movement, but also the force acting on the support arrangement 8 through the drive arrangement 5 (arrow 38) as well as the reaction force acting on the drive arrangement 5 (arrow 37).

Thus, positive guiding of the drive arrangement 5 is provided by the bearing arrangement 3 formed according to the invention in the manner of a parallel guide, which allows movement substantially in the direction of vibration, but not in any other direction. This allows the drive arrangement 5 to freely perform a vibrational oscillation which is triggered by the reaction forces arising when driving the support arrangement 8, here in the same direction (the direction of vibration), but in push-pull with respect thereto. The base 2 is now decoupled from this vibrational oscillation, since the drive arrangement 5 can move with respect to the base in the direction of vibration without restraint thanks to the design of the bearing arrangement 3.

However, the positive guidance prevents the drive arrangement 5 from tilting with respect to the base 2 due to the moments generated during operation. These moments result from the distance of the centers of gravity 31, 32 perpendicular to the direction of vibration (according to the arrows 37, 38) and are transmitted into the base 2 through the rigid links 33a, 33b, but cause hardly any disturbing noise nor vibrations disturbing the environment.

It is now of essence that tilting as a result of the vibrational movement is prevented by the positive guidance, since otherwise the tilting of the drive arrangement 5 necessarily results in tilting of the support arrangement 8 which is guided parallel thereto, i.e., the latter also performs a rotation in addition to the translation, and therefore, of course, also of the feeder trough 9 arranged on the support arrangement 8, of which a vertical component of the vibrational movement of its front end 10b thus deviates from that of its rear end 10a (the base 2 extends horizontally, so that the vibrational movement has a horizontal component vx according to diagrams 20 and 45, and a vertical component). Such a deviation would disturb the feeding movement and thus the mass flow at the front end 10b of the feeder trough 9.

It results in that in the formation according to the invention of the vibratory feeder 30 there are means which, during operation of the vibratory feeder 30, 40, 60, 90, 100, 110 (see also the following FIGS. 3b to 8b) generally suppress a deviation of the vertical component of the vibrational movement of the front end 10b of the feeder element (here the feeder trough 9) from that of the rear end 10a.

Furthermore, it results in that the means for suppressing the deviation are preferably designed to suppress a tilting movement of the feeder element (which in the embodiments shown is designed as feeder trough 9) in a vertical plane lying in feeding direction 14 during operation.

At this point it should be noted that the vibration element can be designed as desired, for example as a plate or tube, as the person skilled in the art will provide it in the specific case with regard to the feeding requirements.

In an embodiment not shown in the figures, the upper hinge points of the links of the bearing arrangement 3 are located on the support arrangement 8 and not on the drive arrangement 5, wherein then the deflection of the links is greater, since the amplitude of the vibrational movement of the feeder trough 9 is greater than that of the drive arrangement 5 due to its smaller mass. However, the vibrational oscillations are decoupled equally effectively from the base 2 and the same moments are introduced in the latter, as is the case with the embodiment shown in FIG. 3a.

Thus, the result is that the means for suppressing the deviation have a bearing arrangement 3 which supports the vibratory feeder 40, 60, 90, 100 (see also the following figures) for a positively guided, substantially translational movement in the direction of the throwing angle (arrow 38) of the support arrangement 8 and wherein preferably the bearing arrangement 3 engages on the drive arrangement 5.

FIG. 3b shows a vibratory feeder 40 as the preferred modification of the first embodiment of the invention shown in FIG. 3a. The drive arrangement 5 is modified by the distribution of its mass, for example by the arrangement of an additional mass 41, such that its center of gravity 42 lies on a straight line which runs through the common center of gravity 32 of the support arrangement 8 with the feeder trough 9 (preferably filled according to operation) and is parallel to the direction of vibration, i.e. has a gradient in the amount of the throwing angle. Thus, the distance between the centers of gravity 32, 42 on a vertical to the direction of vibration is substantially zero, i.e. no more tilting moments are generated. Thus, the base 2 is not only decoupled from the vibration vibrations of the vibration feeder 40, in addition, no tilting moments are introduced into it.

Of course, it is not absolutely necessary to precisely align the center of gravity of the drive arrangement 5 in such a way that it lies on a straight line having the angle of inclination of the direction of vibration with the center of gravity of the support arrangement 8 (including feeder trough 9 and preferably including its filling with bulk material), since the embodiment according to FIG. 3a with good controllability of the vibratory feeder only introduces tilting moments into the base.

In addition, a vibration feeder 40 is preferably designed for a standard feeder trough 9, which can be replaced by another channel for various reasons. Also, the bulk material 12 has different weights (FIG. 1). All in all, the person skilled in the art will advantageously reduce the tilting moments according to the needs of the concrete case by adjusting the gradient of the straight line, in which the centers of gravity 32, 42 lie, as closely as possible to the throwing angle:

The tilting moments are already substantially reduced if the gradient of the straight line of the throwing angle deviates preferably 20° or less, particularly preferably 10° or less for sensitive environments, and more preferably 5° or less for an environment to be kept free of interference, and most preferably corresponds substantially to the throwing angle if the vibrational oscillations of the drive arrangement 5 and also all vibration moments are to be decoupled from the base 2. Of course, the person skilled in the art will keep the deviation from the throwing angle smaller for a feeder element 14 that is long in the feeding direction than for a short feeding element.

Preferably, the person skilled in the art will use these values for the deviation of the straight line, on which the centers of gravity 32, 42 lie, with a center of gravity of the support arrangement 8 which includes the mass of the feeder trough 9.

Therefore, this results in that the means for suppressing the deviation have an arrangement of the center of gravity of the support arrangement with the feeder element resting on it and the center of gravity of the drive arrangement on a straight line in the direction of the throwing angle, wherein the direction of the straight line deviates from the throwing angle preferably by 20° or less, particularly preferably 10° or less and more preferably 5° or less from the throwing angle and most preferably substantially corresponds to the throwing angle.

It should be noted here that theoretically remaining vertical oscillations caused by the arcs 36a, 36b (instead of a straight line with the gradient of the throwing angle) are practically negligible, since the curvature of the arc 36a, 36b plays no practical role in view of the short vibration path.

It should be mentioned that a substantial decoupling of the vibrational oscillation from the substrate can already be achieved if the tangent to the arcs 36a, 36b does not geometrically exactly match the direction of vibration. In this respect, it can be stated that in the specific case, the person skilled in the art will strive for a deviation of the tangent from the throwing angle of 5° or less, but may also provide those deviations which apply to the direction of the straight line on which the centers of gravity 32, 42 lie.

FIG. 4a shows a longitudinal section through the filling channel 11 and a feeder trough 9 of a vibratory feeder, wherein the bulk material 15, which is fed in the feeder trough 9 by means of vibrational movements, exits at the front end 10b thereof. Conceptually, the feeder trough 9 is divided into 4 sections i, ii, iii and iv. The bulk material 15 flows from the filling channel 10 through each section i, ii, iii and iv until it is discharged from feeder trough 8.

FIG. 4b shows two diagrams 45 and 55 regarding the flow of bulk material 12 in the feeder trough 9 of FIG. 3a according to a simulation of the applicant, the dynamics of bulk material 12 being shown in the four sections i to iv. In particular, the diagrams in FIG. 4b show the conditions in the case of an increase in feeding quantity with an increase in mass flow from approx. 0.008 kg/s to 0.025 kg/s.

Diagram 45 shows the velocity vx in the feeding direction (FIG. 1) of the bulk material 15 in each of the four sections i to iv (FIG. 4a), namely according to curve 46 in section i, the curve 47 in section ii, the curve 48 in section iii and the curve 49 in section iv.

At the time t=2 s, the feeding quantity is increased, wherein the bulk material velocity in all sections i to iv increases simultaneously and practically without delay from the previous (time period 50) to the new, stable velocity (time period 51), see the jump discontinuities in the curves 46 to 49 in time period 52.

The change of the velocity vx of the bulk material 12 in the feeding direction 14 (FIG. 3a) takes place approximately spontaneously, as is the case in a vibratory feeder 1 (FIG. 1) according to the prior art (FIG. 1 and Diagram 20 of FIG. 2).

Diagram 55 shows the mass flow kg/s of bulk material 12 in the feeding direction 14 (FIG. 3a) in each of the four sections i to iv (FIG. 3a), namely according to the curve in section i, curve 57 in section ii, curve 58 in section iii and curve 59 in section iv.

Before the increase in flow rate at the time t=2 s (section 50), the mass flow shows practically the same value in all sections i to iv. After the increase in feeding quantity, the mass flow increases simultaneously and without delay in all sections i to iv, and in contrast to the prior art (Diagram 25 of FIG. 2) also in section iv, i.e. at the front end 10b of the feeder trough 9 (FIG. 4a). In contrast to the prior art (see Diagram 25), the time period 51 in which the change in mass flow takes place in section iv has fallen from approx. 3.5 seconds to less than 1/10 seconds.

According to the applicant's findings, the massively improved behavior of the mass flow in section iv (FIG. 4a) during a change in feeding quantity in all exemplary embodiments according to the present description is due to the fact that during operation of the vibratory feeder, a deviation of the vertical component of the vibrational movement of the front end of the feeder element 10b from that of the rear end 10a is suppressed, i.e., compared to the prior art, is partially or substantially completely reduced for good controllability.

This prevents that depending on the feeding quantity or feeding rate, stationary material accumulations can form during operation along the length of the feeder element or the feeding trough 9, which material accumulations are rearranged and form differently when the feeding rate changes. This rearrangement (which is substantially avoided according to the invention) is slow, in the range of seconds, and has the consequence that the mass flow of a vibratory feeder of the prior art according to FIG. 2 also changes slowly.

The significantly improved behavior of the mass flow output from the feeder trough 9 (FIG. 4a) is confirmed by measurements. It is indeed true that different materials react differently. The improvement is concise for most materials and not relevant for a few materials. The person skilled in the art can easily determine these few materials by appropriate testing.

FIG. 5a shows a view of the concrete configuration of a vibratory feeder 60 according to the invention according to the first preferred embodiment of the invention schematically shown in FIG. 3b.

The vibratory feeder 60 has two spring units 61a, 61b, in each of which identical parts of the drive arrangement 5 (support 65a, 65b, see below), the translational vibrational movement arrangement 6 (leaf springs 7a, b according to FIG. 3b) and the bearing arrangement 3 (link 33a, b according to FIG. 3b) are combined into a functional unit. The spring units 61a, b are shown in detail in FIGS. 5b and 5c.

The drive arrangement 5 has four parallel struts, of which the upper right 63 and lower right 64 parallel struts, as viewed in feeding direction 14, can be seen (the two left parallel struts are covered by the right parallel struts). The additional mass 41 is arranged horizontally and/or vertically adjustable at the rear end of the parallel struts 63, 64, and likewise, of course, on the covered parallel struts, which for simplicity's sake are no longer explicitly mentioned below alongside the visible parallel struts 63, 64, but are always implicitly included.

The drive arrangement 5 further includes two supports 65a, b, which are preferably (compactness of the arrangement) fixed in an inclined manner, with the throwing angle inclined relative to the vertical, between the left and right parallel struts 63, 64, here via screws 63'a, 64'a and 63"a, 64"b.

Arranged on each support 65a, 65b is a leaf spring 66a, 66b which in turn is connected via an associated leaf spring holder 67a, 67b to the support arrangement 8 which is formed here as a plate and thus carries the same in a translationally movable manner. Furthermore, on each support 65a, 65b there is arranged one link 68a, 68b which extends downwards and is connected via a link holder 69a, 69b to a base plate 70, which rests on the base 2, so that the drive arrangement 5 is carried via the links 68a, 68b to be translationally movable with respect to the base 2. Of course, the person skilled in the art can also provide for the link holders 69a, 69b to be arranged directly on the base.

Due to this arrangement, the leaf springs 66a, 66b are part of the translatory vibration arrangement 6 and the links 68a, 68b are part of the bearing arrangement 3 (see FIGS. 3a and 3b).

The drive arrangement 5 further includes two drive supports arranged on the parallel struts 63, 64, of which the right mounting bracket 71 is visible, the left mounting bracket is covered by the right mounting bracket 71, as well as a vibration drive 72 supported on them and having a transmission element 73, which, due to the vibration drive 72, vibrates along its longitudinal axis 74. The longitudinal axis 74 is preferably inclined corresponding to the throwing angle.

FIGS. 5b and 5c show the functional unit 61b in detail, FIG. 5b in a side view and FIG. 5c in a diagonal view from below. It should be noted here that the functional unit 61a has the same structure, i.e., does not need to be described in more detail.

The support 65b is provided with screw holes 63"b and "b for screws 63'b and 64'b (FIG. 5a).

The link 68b has the shape of an m, with an upper crossbar 75b, through which it is screwed with two screws 76b, 76b' at the upper end of the support member 65b. In FIG. 5b, screw 76b is covered by screw 76b'.

From the 75b crossbar, two outer legs 77b, 77b' of the link 68b extend downwards along the outer sides of the support 65b up to the link holder 69b, to which they in turn are fixed via screws 78b, 78b' (screw 78b is hidden in FIG. 5b). Legs 77b, 77b' have an upper elastic joint 79b, 79b' and a lower elastic joint 80b, 80b' (the joint 79b, 80b is hidden in FIG. 5b).

It can be seen in FIG. 5c that a central stop element 81b extends downwards from the crossbar 75b, which stop element is located between the outer legs 77b, 77b' and on which a magnet 82b is arranged which cooperates operatively with a counter magnet 82b', which in turn is firmly connected via a foot 83b to the link holder 69b and thus to the base plate 70 (FIG. 5a). The magnet 82b and the counter magnet 82b' repel each other.

The leaf spring 66b is fixed to the leaf spring holder 67b with upper screws, the upper screw 85b' of which can be seen, and to the lower end of the support 65b with lower screws, the lower screw 86b' of which can be seen.

The leaf spring holder 67b and the link holder 69b have chamfered connection surfaces 87b and 88b, respectively, such that the spring unit 61b mounted in the drive arrangement 5 is inclined with respect to the vertical at a throwing angle.

The result is that means for suppressing the deviation have a combined spring unit 61a, 61b, with a link 66a, 66b, 68a, 68b provided in each case in the vibration movement arrangement 6 and the bearing arrangement 3, and a support 65a, 65b provided in the drive arrangement 5 and extending over a height and inclined substantially at a throwing angle relative to the vertical, wherein the links 66a, 68a, 66b, 68b extend along the support 64a, 65b on different sides thereof, and wherein the link of the vibrational movement arrangement (6) is fixed to the support 65a, 65b in a lower region thereof and extends upwardly, the link 68a, 68 of the bearing arrangement 5 is fixed to the support 65a, 65b in an upper portion thereof and extends downwardly, whereby the upper end of the link of the vibrational movement arrangement 6 is fixed to the support arrangement 8 and the lower end of the link 68a, 68b of the bearing arrangement 3 is fixed to the base 2.

The means for suppressing the deviation according to FIGS. 5a to 5c preferably comprise two combined spring units 61a, 61b, the supports 65a, 65b of which are connected to one another by a connecting element, wherein a vibration drive 72 is provided which preferably acts on the support 65a, 65b of the one spring unit 61a, 61b on the one side and on the upper end of the link of the vibrational movement arrangement 6 of the other spring unit 61b, 61a on the other side.

FIGS. 5a to 5c show the rest position of the vibratory feeder 60, and thus the rest position of the spring units 61, 61b.

The rest position is defined by the magnets (magnet 82b and magnet 82b', see FIGS. 5b and 5c) which are arranged on the spring units 61a, 61b, and which prevent the supports 65a, 65b from tilting further due to the weight of the support arrangement 8 (with the feeder trough 9) and the drive arrangement (with the eccentric mass 41) and thus establish a stable rest position of both, the drive arrangement 5 and the support arrangement 8. The leaf springs 66a, 66b are aligned straight, i.e. are not under load, and therefore not bent.

During operation, i.e. with activated vibration drive 72, the transmission element 73 moves the leaf spring holder 67b cyclically around the rest position away from and back towards the vibration drive 72—thus, the support arrangement 8 performs the vibrational movement, which is translational relative to the drive arrangement 5, since the equally long and equally inclined leaf springs 66a, 66b with their fixed clamping at the upper and lower ends form a parallel guide for the support arrangement 8.

The leaf spring holder 67b extends on an arc around the lower end of the associated leaf spring 66b fixed by the screws 86b'. However, due to the design of the spring unit 61b, its length is large, so that the arc is sufficiently flat to assume that the translational movement of the support arrangement 8 is straight.

Thus, the displacement of the support arrangement 8 relative to the drive arrangement 5 is substantially constant over the entire vibrational movement in the feeding direction and in the vertical direction.

As mentioned above in the description of FIG. 3b, it is the case that, on the one hand, due to the suitable arrangement of the mass 41 on the drive arrangement 5, its center of gravity and the center of gravity of the support arrangement 8 (with feeder channel 9) lie on a straight line with a gradient equal to the throwing angle. Also, the reaction force of the support arrangement 8 set in vibration acts on the drive arrangement 5.

Due to this reaction force, the drive arrangement 5 performs a translational vibrational oscillation in the direction of the throwing angle with respect to the base plate 70, since the links 68a, 68b are pivotable around the elastic joints 80b, 80b' (FIG. 5c) with respect to the base plate 70, while the upper elastic joints 79b, 79b' allow an inclination of the supports 65a, 65b that remains unchanged during pivoting. The links 68a, 68b thus form a parallelogram guide for the drive arrangement 5. Here too, it applies that by the comparatively large length of the outer legs 77b, 77b' of the links 68a, 68b', the supports 65a, 65b run on a sufficiently flat arc to assume the translational movement of the drive unit 5 in relation to the base plate 70 as being straight and inclined at the throwing angle.

As mentioned with reference to FIG. 3a, it is possible to use rigid links instead of leaf springs 66a, 66b.

The result is that the means for suppressing the deviation comprise a combined spring unit 61a, 61b, each having a link 68a, 68b provided in the vibrational movement arrangement 6 and the bearing arrangement 3, and a support 65a, 65b which is provided in the drive arrangement 5 and extends over a height and is inclined substantially at a throwing angle relative to the vertical, wherein the links extend along the support member on different sides thereof, and wherein the link of the vibrational movement arrangement 6 is fixed to the support 65a, 65b in a lower region thereof and extends upwardly, the link 68a, 68b of the bearing arrangement 3 is fixed to the support 65a, 65b in an upper region thereof and extends downwardly, whereby the upper end of the link of the vibrational movement arrangement 6 is fixed to the support arrangement 8 and the lower end of the link 68a, 68b of the bearing arrangement 3 is fixed to the base 2.

In the embodiment shown in the figure, the means for suppressing the deviation comprise two combined bearing units 61a, 61b, the supports 65a, 65b of which are connected together by a connecting element, wherein a vibration drive (72) is provided which acts on the support 65a, 65b of one spring unit 61a, 61b on one side and on the upper end of the link of the vibrational movement arrangement (6) of the other spring unit 61b, 61a on the other side.

FIG. 6 shows schematically a second embodiment of a vibratory feeder 90 according to the invention which, except for the bearing arrangement 3, is formed analogous to the embodiment according to FIG. 3b. Shown are the feeder trough 9, the support arrangement 8 as well as the common center of gravity 32 of the support arrangement 8 and the feeder trough 9. Also shown are the drive arrangement 5, its center of gravity 42 and the leaf springs 7a, 7b, which connect the latter to the support arrangement 8.

The centers of gravity 32, 42 lie on a straight line (indicated by the arrows 91, 92), the gradient of which corresponds to the throwing angle (a possible additional mass 41 (FIG. 3b) is omitted to simplify the figure), so that no tilting moments occur during operation of the vibratory feeder 90.

The bearing arrangement 3 has schematically illustrated elastically deformable support members 93a, 93b, which decouple the base 2 from vibrational oscillations of the drive arrangement 5 by their elastic deformation. According to the invention, the support members 93a, 93b are formed to suppress a deviation of the vertical component of the vibrational movement of the front end 10b of the feeder element formed as feeder trough 9 from that of the rear end 10a.

FIG. 7a schematically shows the geometry and the design of the support members 93a, 93b of the vibration feeder 90 of FIG. 6:

The drive arrangement 5 and the support arrangement 8 with their centers of gravity 32, 42 are indicated by dashed lines. The center of gravity 32 of the support arrangement preferably further comprises the mass of the feeder element that is omitted to simplify the figure, which is filled particularly preferably for operational reasons. The centers of gravity 32, 42 are located on a straight line in the direction of the throwing angle, more preferably with an accuracy of 5° or less, i.e. most preferably substantially in the direction of the throwing angle. The double arrow 94 symbolizes this straight line and indicates the movement of the centers of gravity 32, 42 towards and away from each other in push-pull operation during operation. Thereby, tilting of the vibration feeder 90 due to the vibrational movement is eliminated, even though it is mounted in a freely movable manner with respect to the base 2.

Bearing points 96a, 96b, at which the spring units 93a, 93b engage, are provided on the drive arrangement 5.

The spring units 93a, 93b each have a horizontally aligned elastic spring 97a, 97b, which face each other in such a way that their lines of action coincide and run through the center of gravity 42. Furthermore, in each case one vertically aligned elastic spring 98a, 98b is provided, both having a vertical line of action.

All springs 97a, 97b, 98a, 98b are arranged between base 2 and their associated bearing point 96a, 96b and have the same spring constant. In addition, the center of gravity 42 is located midway between the bearing points 96a, 96b.

With this arrangement it is ensured that with each occurring deflection of the center of gravity 42 during the operational vibrational oscillation of the drive arrangement 5, the resultant of the restoring forces of the spring units 93a, 93b always point to the rest position of the center of gravity 42. As a result, the drive arrangement 5 is set back from any deflection on a straight line into the rest position, thus oscillates translationally back and forth in the direction of the throwing angle in accordance with the straight line. Since the support arrangement 8 (FIG. 6) is connected via a parallel guide to the drive arrangement 5, the feeder element arranged on it also vibrates translationally at the throwing angle, so that during operation of the vibratory feeder a deviation of the vertical component of the vibrational movement of the front end of the feeder element from that of the rear end is suppressed despite the spring-elastically bearing of the drive arrangement 5 that is deflectable in all directions.

The result is that means are provided in the vibratory feeder 90 which, during operation of the vibratory feeder, suppress a deviation of the vertical component of the vibrational movement of the front end of the feeder element from that of the rear end.

In contrast to the vibratory feeder 40 (FIG. 3b), tilting moments in the second embodiment illustrated in FIGS. 7a and 7b caused by a distance of the centers of gravity 32, 42 on a vertical with respect to the throwing angle have a negative effect on the controllability improved according to the invention of the vibratory feeders 90, 100. In the specific case, the person skilled in the art will therefore prefer to design them in such a way that the straight line on which the centers of gravity 32, 42 lie deviates by less than 10° from the throwing angle and corresponds as closely as possible to the throwing angle.

These means preferably have an arrangement of the center of gravity 32 of the support arrangement 8 with the feeder element resting thereon and of the center of gravity 42 of the drive arrangement 5 on a straight line in the direction of the throwing angle, wherein the gradient of the straight line deviates from the throwing angle particularly preferably by 10° or less and more preferably by 5° or less from the throwing angle and most preferably substantially corresponds to the throwing angle.

More preferably, these means comprise a modified bearing arrangement 3 with two spring-elastic bearing units 93a, 93b which are spaced apart from one another in the feeding direction 14 and which are supported on the base 2 and engage on the drive arrangement 5 in bearing points 96a, 96b, wherein each bearing unit 93a, 93b is operative in horizontal and in vertical directions with the same spring constant, and the straight line on which the centers of gravity 32, 42 lie intersects a connecting line between the bearing points 93a, 93b substantially in the middle thereof.

FIG. 7b shows a corresponding vibratory feeder 100, with a drive arrangement 5, the center of gravity 42 of which is not situated on the support but on the straight line defined by the double arrow 94, which intersects the support 5 in the middle. The spring units 93a, 93b are formed in the same way as those of the vibratory feeder 90 of FIG. 7a. This embodiment is also according to the invention, since it has the same properties with regard to the vibrational movement of the feeding element as the vibratory feeder 90 of FIG. 7a.

The advantage of the vibratory feeder 100 is that for the design of the drive arrangement 5, the restriction "center of gravity 42 in the middle between the connecting lines of the bearing points 96a, 96b" is omitted, since the center of gravity must only lie on the straight line in the direction of the throwing angle through the center of gravity of the support arrangement 8 (preferably together with the feeder element 9). This can simplify the design of drive arrangement 5.

Advantageously, at least one of the bearing points 96a, 96b on the bearing arrangement 5 is formed to be displaceable (horizontally and/or vertically). In a specific case with a predetermined center of gravity 42 of the bearing arrangement 5, the person skilled in the art can now simply move the bearing points 96a, 96b in such a way that the geometric conditions according to FIG. 7a or 7b are maintained, namely that the straight line in the direction of the throwing angle on which the centers of gravity 32, 42 are located, intersects the connecting line between the bearing points 96a, 96b in the middle.

Alternatively or cumulatively, the drive arrangement may have a mass element which preferably is arranged in the feeding direction 14 in a predeterminable and adjustable manner on the drive arrangement 5 such that the position of the center of gravity 42 of the drive arrangement 5 is variable in a predeterminable manner. Thus, the center of gravity 42 can be brought onto the straight line running through the center of gravity 32 of the support arrangement in the direction of the throwing angle (which intersects the connecting line between the bearing points 96a, 96b in the middle).

Again, alternatively or cumulatively with regard to adjustable bearing points 96a, 96b or an adjustable mass element, the throwing angle of the support arrangement 8 can be configured to be adjustable, for example by leaf spring holders 67a, 67b (FIG. 5a) engaging on the support arrangement 8. This makes it possible, for example, to compensate for the change of the feeding element (replacement of a short feeder trough by a long one) or another weight of the bulk material by adjusting the throwing angle based on the unchanged position of the center of gravity 42 of the drive arrangement 5 such that a straight line in the direction of the throwing angle through the center of gravity 42 runs again through the center of gravity 32 of the support arrangement and still intersects the connecting line between the bearing points 96a, 96b in the middle.

In particular, an adjustable throwing angle, in addition to an adjustable mass element, is also advantageous for an embodiment according to FIGS. 3a to 5c.

FIG. 8a shows a view of a feeder element formed as an elongated trough feeder 105 for a vibratory feeder 30, 40, 60, 90, 100 (FIGS. 3a to 7b) according to the present description. Depending on the formation of the feeder trough 105 in connection with the vibrational conditions (vibration frequency, vibration amplitude, length, formation of the cross-section, etc.), i.e. ultimately depending on an excitation in the resonance frequency of the feeder element, deformation oscillations may occur in a region 106 of the feeder trough 105 shown here, which result in a cyclic deflection of the feeder trough 105, so that the front end 107b thereof swings up and down with respect to the rear end 107a according to the double arrow 108, even in operation with a pure translation of the support arrangement 8.

Thus, even if the vibration feeder 30, 40, 60, 90, 100 (FIGS. 3a to 7c) is designed according to the invention, a deviation of the vertical component of the vibrational movement of the front end 107b of the feeder trough 105 from that of the rear end 107a can remain. As a result, the advantage according to the invention of the quick controllability of the vibratory feeder can only be partially realized due to this residual deviation.

FIG. 8b shows a vibration feeder 110 which has been modified with regard to such a deformation vibration of the feeder element 105. The vibratory feeder 110 is basically constructed in the same way as the vibratory feeder 40 of FIG. 3b, but with a modification of the vibrational movement arrangement 111, the links 114a, 114b of which (for example in the form of leaf springs 7a, 7b according to FIG. 3b) engage at the upper hinge points 112a, 112b and lower hinge points 113a, 113b on the support arrangement 8 and the drive arrangement 5, respectively.

At least one of these hinge points, in the figure the hinge point 112a, is now adjustably arranged on the support arrangement 8 and is now fixed slightly displaced in feeding direction 14. Accordingly, in the rest position, the links 114a, 114b are not parallel, thus are arranged obliquely to each other. Thereby, the translational vibrational movement arrangement 6 (FIGS. 1 to 7c) formed as a parallel guide becomes the vibrational movement arrangement 111, which, in addition to the vibrational movement in the direction of the throwing angle, causes the support arrangement 8 to rotate according to the double arrow 116.

In the specific case, the person skilled in the art can now suitably adjust the hinge point 112a (or, depending on the dynamics of the vibration feeder 110, one or more of the hinge points 112a, 112b, 113a, 113b) in any direction (by simulation or testing) in such a way that the deformation vibration 108 is at least partially compensated by the rotation 116.

Analogously, the hinge points 34a, 34b, 35a, 35b of the links 33a, 33b can also be adjusted (or the length of a link 33a, 33b) to compensate the deformation vibration 108 of the feeder trough 105. However, the use of a vibrational movement arrangement 111 appears to be preferred, since then only the smaller mass of the support arrangement 8 including the feeder trough 105 has to be rotated during vibration.

The result in general is that the means for suppressing the deviation (116) are designed to at least partially compensate in operation a deflection of the front end (107b) of the feeder element (105) caused by a deformation oscillation 108 by a rotational movement superimposed on the vibrational movement of the support arrangement (8).

Preferably, the means for suppressing the deviation include an operable guidance of the support arrangement 8 at the drive arrangement 5 by a vibrational movement arrangement 111, which in operation effects a translational and rotational relative movement of the support arrangement 8 with respect to the drive arrangement 5, wherein the vibrational movement arrangement 111 is preferably formed as leaf spring arrangement 114a, 114b.

It further follows that according to the embodiment of FIG. 8b, the vibrational movement arrangement 116 has links 114a, 114b, which are hinged with one end to the support arrangement 8 and with the other end to the drive arrangement 5 via hinge points 112a, 112b, 113a, 113b, wherein at least one of these hinge points 112a, 112b, 113a, 113b is adjustably arranged on the support arrangement 8 or on the bearing arrangement 5 in the feeding direction 14 or in another direction.

In a further embodiment, which is not illustrated in the figures, the vibrational movement arrangement has flexible (such as leaf springs 114a, 114b) or rigid links hinged with one end to the support arrangement 8 and with the other end to the drive arrangement 5, wherein at least one of the links is formed to be adjustable in its effective length. This results in the same possibilities of superimposing the translational vibrational movement of the support arrangement 8 with a rotation that at least partially compensates the deformation oscillation 116 of the feeder trough 105, as is the case with adjustable hinge points 112a, 112b, 113a, 113b according to FIG. 8b.

Finally, as mentioned above, it is also according to the invention that the means for suppressing the deviation comprise an operable guidance of the bearing arrangement (5) on the base (2) by means of a bearing arrangement which in operation effects a translational and rotational relative movement of the drive arrangement (5) with respect to the base (2) such that in operation a deflection of the front end 107b caused by a deformation oscillation 108 of the feeder element 105 is at least partially compensated by a rotational movement superimposed on the vibrational movement of the support arrangement (8).

The invention claimed is:

1. A vibratory feeder comprising a support arrangement carrying out a vibrational movement when in operation for a feeder element in which material to be fed is fed, a drive arrangement for the support arrangement and a bearing arrangement which introduces vibrational oscillations of the vibratory feeder in a reduced manner into a base, wherein means are provided which, during operation of the vibratory feeder, suppress a deviation of a vertical component of the vibrational movement of a front end of the feeding element from that of a rear end of the feeding element, wherein the means for suppressing the deviation have a parallel guide provided in the bearing arrangement, including two rigid links, configured to suppress during operation a tilting movement of the feeder element in a vertical plane lying in the feeding direction.

2. The vibratory feeder according to claim 1, wherein the drive arrangement has a mass element which is preferably arranged on the drive arrangement to be adjustable in the feeding direction or in the vertical direction in a predetermined manner such that the position of the center of gravity of the drive arrangement can be changed in a predetermined manner.

3. The vibratory feeder according to claim 1, wherein the means for suppressing the deviation comprise a bearing arrangement which supports the vibratory feeder for a positively guided, substantially translational movement in the direction of a throwing angle of the support arrangement and wherein preferably the bearing arrangement engages on the drive arrangement.

4. The vibratory feeder according to claim 1, wherein the means for suppressing the deviation have an arrangement of a center of gravity of the support arrangement, preferably with the feeder element resting thereon, and of a center of gravity of the drive arrangement on a straight line in the direction of a throwing angle, wherein the direction of the straight line preferably deviates from the throwing angle by 20° or less.

5. The vibratory feeder according to claim 1, wherein rigid links engage on the support arrangement.

6. The vibratory feeder according to claim 1, wherein a throwing angle of the vibrating support arrangement is configured to be adjustable.

7. A vibratory feeder comprising a support arrangement carrying out a vibrational movement when in operation for a feeder element in which material to be fed is fed, a drive arrangement for the support arrangement and a bearing arrangement which introduces the vibrational oscillations of the vibratory feeder in a reduced manner into a base wherein means are provided which, during operation of the vibratory feeder suppress a deviation of the vertical component of the vibrational movement of a front end of the feeding element from that of a rear end,
wherein the means for suppressing the deviation have a combined spring unit comprising a link provided in each case in the vibrational movement arrangement and the bearing arrangement, and a support member provided in the drive arrangement and extending over a height and inclined with respect to the vertical substantially at a throwing angle, wherein the links extend along the support member on different sides thereof, and wherein the link of the vibrational movement arrangement is fixed to the support member in a lower region thereof and extends upwards, the link of the bearing assembly is fixed to the support member in an upper region thereof and extends downwards, whereby the upper end of the link of the vibrational movement arrangement is fixed to the support arrangement and the lower end of the link of the bearing assembly is fixed to the ground.

8. A vibratory feeder comprising a support arrangement carrying out a vibrational movement when in operation for a feeder element in which material to be fed is fed, a drive arrangement for the support arrangement and a bearing arrangement which introduces vibrational oscillations of the vibratory feeder in a reduced manner into a base wherein means are provided which, during operation of the vibratory feeder suppress a deviation of the vertical component of the vibrational movement of a front end of the feeding element from that of a rear end,
wherein the means for suppressing the deviation have an arrangement of a center of gravity of the support arrangement, preferably with the feeder element resting thereon, and of a center of gravity of the drive arrangement on a straight line in the direction of a throwing angle, wherein the direction of the straight line preferably deviates from the throwing angle by 20° or less, particularly preferably by 10° or less,
wherein the means for suppressing the deviation further comprise a bearing arrangement having two spring-elastically operating bearing units spaced apart from one another in the feeding direction, which are supported on the base and engage on the drive arrangement in bearing points, wherein each bearing unit is operative in horizontal and vertical directions with the same spring constant, and the straight line in the direction of the throwing angle intersects a connecting line between the bearing points substantially in the middle thereof.

9. The vibratory feeder according to claim 8, wherein at least one bearing point is configured to be displaceable in one direction.

10. A vibratory feeder comprising a support arrangement carrying out a vibrational movement when in operation for a feeder element in which material to be fed is fed, a drive arrangement for the support arrangement and a bearing arrangement which introduces vibrational oscillations of the vibratory feeder in a reduced manner into a base wherein means are provided which, during operation of the vibratory feeder suppress a deviation of the vertical component of the vibrational movement of a front end of the feeding element from that of a rear end,
wherein the means for suppressing the deviation are configured to at least partially compensate in operation a deflection of the front end of the feeder element caused by a deformation vibration by a rotational movement superimposed on the vibrational movement of the support arrangement.

11. The vibratory feeder according to claim 10, wherein the means for suppressing the deviation comprise an operable guidance of the support arrangement on the drive assembly by means of a vibrational movement arrangement which in operation causes a translational and rotational relative movement of the support arrangement with respect to the drive arrangement, wherein the vibrational movement arrangement is preferably formed as a leaf spring arrangement.

12. The vibratory feeder according to claim 11, wherein the vibrational movement assembly comprises links which are hinged with the one end to the support arrangement and with the other end to the drive arrangement via hinge points, wherein at least one of these hinge points is arranged on the support arrangement or on the bearing assembly to be adjustable in the feeding direction or in a different direction.

13. The vibratory feeder according to claim 11, wherein the vibrational movement arrangement comprises flexible or rigid links which are hinged with the one end to the support arrangement and with the other end to the drive arrangement, wherein at least one of the links is formed to be adjustable in its effective length.

14. The vibratory feeder according to claim 10, wherein the means for suppressing the deviation comprise an operable guidance of the bearing arrangement on the base by means of a bearing arrangement which in operation causes a translational and rotational relative movement of the drive arrangement with respect to the base.

* * * * *